United States Patent Office 3,501,245
Patented Mar. 17, 1970

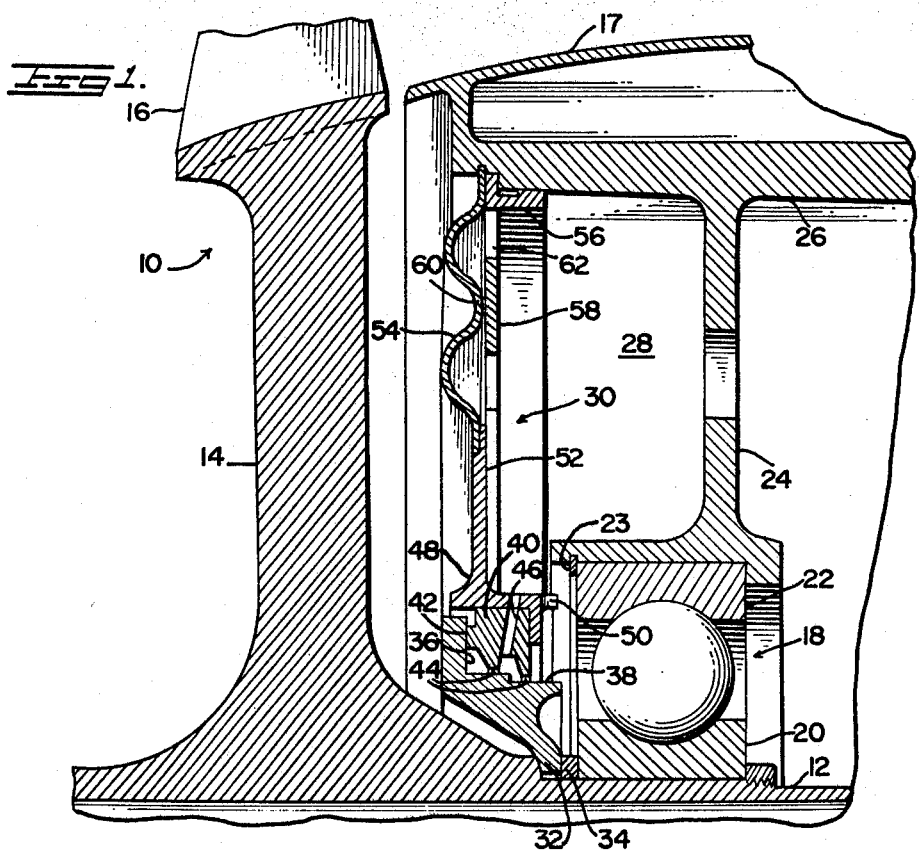
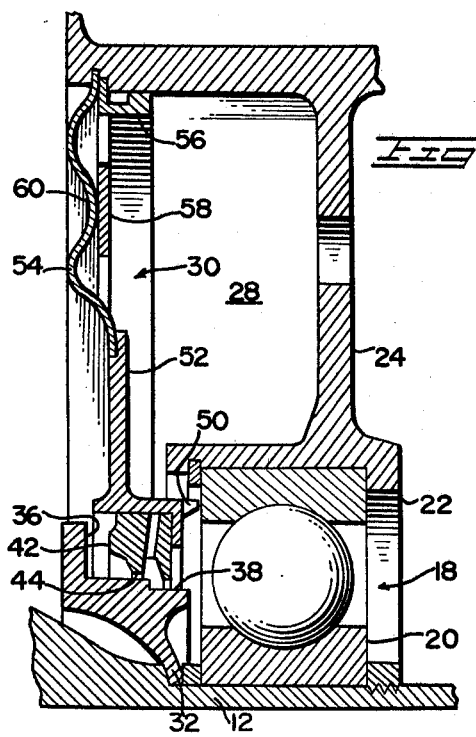
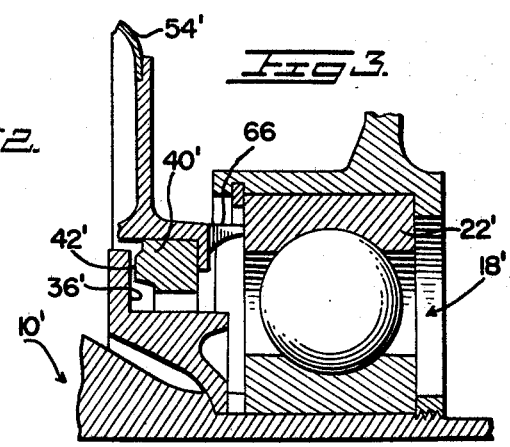

3,501,245
SEAL ASSEMBLIES
Theodore Ivanko, Fairfield, Conn., assignor to Avco Corporation, Stratford, Conn., a corporation of Delaware
Filed Mar. 4, 1968, Ser. No. 710,306
Int. Cl. B01d 11/00, 1/00
U.S. Cl. 415—113        9 Claims

ABSTRACT OF THE DISCLOSURE

The disclosure illustrates a seal for an annular sump chamber in which a rotor of a gas turbine engine is journaled. The seal assembly comprises a convoluted diaphragm secured around its periphery to the annular sump chamber and around its inner edge to a seal element which is urged forward by the diaphragm to abut an axial sealing face for relatively low operating conditions of the engine and during rest. During operation of the engine, pressurized air extracted from the engine flow path deflects the diaphragm and seal ring element away from the axial sealing face to function either as a fixed gas face seal or as a radial seal assembly. Stops are provided to limit the displacement of the diaphragm and seal element to limit the stress of the diaphragm.

---

The present invention relates to seal assemblies and more specifically to seal assemblies used in conjunction with rotating members.

A typical use for seals which seal rotating members is found in the gas turbine engine. This type of engine usually includes a bladed rotor journaled at various stations along its length in annular sump chambers. These chambers provide a support for bearings which journal the rotor and contain lubricating fluid used to cool and lubricate the bearing. The edge of the sump chambers and the rotor form annular openings which are sealed by seal assemblies.

The seal assemblies may take the form of a seal ring which is mounted to the annular sump chamber and adapted to cooperate with a sealing surface on the rotor to form a radial-type seal. The seal ring may either be in contact with or be closely spaced from the radial sealing face, but in either case it is generally necessary to pressurize the exterior side of the sealing face with air to a level higher than that in the interior of the sump so that any leakage across the seal is air passing to the interior of the sump chamber. This has been greatly effective in minimizing, if not eliminating, lubricating fluid leakage from the sump chambers during operation of the engines at high rotor speeds.

The source of pressurized air for the exterior of the seals is derived from one of the stages of the compressor of the engine. The pressure levels available from the compressor are very high during operation of the engine at a cruise or emergency rate and more than adequate for maintaining a pressure differential across the seal to prevent lubricating fluid leakage. However, operation of the engine at idle or start conditions may result in insufficient air pressure from the compressor to maintain a pressure differential across the seal. When this happens oil can leak from the sump chamber. The problem is aggravated during conditions where the engine is at rest, inasmuch as there is no air pressure available for pressurization of the seal and any residual lubricating fluid found near the seal ring is free to leak from the sump chamber. This latter problem becomes especially significant when the gas turbine engine is used in a vertical-take-off (VTO) and landing aircraft. In these types of aircraft the engines are frequently maintained in a vertical position, thus allowing any residual oil in the sump chamber to flow to the area around the seal ring by gravity.

Accordingly, it is an object of the present invention to provide a simplified highly effective and positive means for sealing the space between a housing and a rotating shaft which operates over a broad range of rotational speeds.

The above ends are achieved in the broader aspects of the present invention by providing a seal assembly for an annular opening between a rotatable member and an annular housing through which the rotatable member extends. The opening is subject to a fluid pressure differential on opposite sides for rotation of the member at normal operating rates and is subject to a negligible pressure differential at low rates of rotation. The seal assembly comprises sealing face means on the rotatable member and a seal means for cooperating with the radial and axial sealing faces to form seals. The seal means is axially displaceable between a first position in which the seal means cooperates with the sealing face means to form an abutting axial face-type seal and a second position in which the seal means and the sealing face means cooperates with the fluid pressure differential to form a seal for preventing leakage thereacross against said fluid pressure differential. Means secured to the annular housing support the seal means and provide a barrier across the annular opening. The seal support means is adapted to yieldingly urge the seal means towards the first position against the action of the pressure differential so that at below substantially low rates of rotation the seal means cooperates with the sealing face means to form an abutting face-type seal for the opening and for normal rates of operation cooperates with the sealing face means to seal the opening in the second position.

The above and other related objects and features of the present invention will be apparent from a reading of the description of the disclosure found in the accompanying drawings and the novelty thereof pointed out in the appended claims.

In the drawing:

FIGURE 1 is a longitudinal section view of a seal assembly embodying the present invention as used with a gas turbine engine, the seal being shown in a static condition;

FIGURE 2 illustrates the seal assembly of FIGURE 1 but in a dynamic condition wherein the rotating member is operating at a normal rate of operation;

FIGURE 3 shows a seal assembly illustrating an alternate embodiment of the present invention.

Referring specifically to FIGURE 1, there is shown a portion of a gas turbine engine with which the present invention may be used. The engine includes a rotor 10 comprising an inner hollow shaft portion 12, an integral supporting disk 14 and a plurality of blades 16 extending across an annular motive fluid flow path through the engine. As herein illustrated, the plurality of blades 16 form a compression stage in the engine so that rotation of the shaft 12 and disk 14 pressurize air flowing past the blades 16. An annular duct 17 is positioned closely adjacent the downstream edge of the blades 16 to form, in part, the flow path for the air and to permit a flow of pressurized air to the inner shaft portion 12, as later described in detail.

The inner shaft 12 is journaled for rotation by a bearing assembly 18 having an inner race 20 telescoped over the shaft 12 and an outer race 22 secured as by a retaining clip 23 in an annular support structure 24. The annular support structure 24 extends to a cylindrical support structure 26 which additionally forms the outer bounds of a sump chamber 28 for the bearing assembly 18. It should be pointed out that the specific structural embodiment of the engine rotor, bearing sump chamber and the bearing assembly 18 is exemplary and is not intended to be a limitation on the present invention. It is apparent to those skilled in the art that the configuration of the rotor and the sump chamber is dictated by the particular design requirements of the engine. However, the sump chamber 28, besides forming a support for the bearing assembly 18, also provides a chamber in which lubricating fluid used to lubricate and cool the bearing assembly 18 is contained. The lubricating fluid may be directed under high pressure directly at the bearing assembly 18 which results in a high concentration of lubricating fluid adjacent the bearing assembly. This excess of fluid is for the most part flung to the outward portion of the sump chamber 18 where a scavenge pump (not shown) located in the lower portion of the sump extracts the lubricating fluid and delivers it to a recirculating lubricating system. While most of the lubricating fluid passes through to the scavenge pump, a portion of it tends to collect around the annular opening between the sump chamber walls 26 and the rotor shaft 12.

It is across this annular opening that a seal assembly 30 embodying the present invention is utilized. The seal assembly comprises an annular seal face support element 32 telescoped over the shaft 12 and maintained away from the inner race of the bearing 20 by a spacer 34. An axial sealing face 36 and a radial sealing face 38 are formed around the outer circumference of the seal face support element 32. A seal ring 40, formed from materials commonly used in the seal art, is positioned adjacent the axial and radial sealing faces 36 and 38 and suitably mounted on an axially displaceable annular seal support member 48. The seal ring 40 has a circumferentially extending axial sealing face 42 to form an abutting axial face-type seal with the axial sealing surface 36. The seal ring 40 additionally has a pair of circumferentially extending sealing faces 44 which cooperate with the radial sealing surface 38, which has a step thereon to form a stepped labyrinth radial-type seal. A series of radial passageways 46 extend from between the sealing faces 44 and open into the outer portion of the chamber 28, the purpose of which will be described later.

The seal support element 32 has a plurality of aft projections 50 which abut the outer race 22 of the bearing assembly 18 to limit the axial displacement of the seal ring 40. An integral flange 52 extends outward from the seal support member 48 to form the inner mounting for a flexible diaphragm 54, having a series of circumferentially extending convolutions. The outer edge of the convoluted diaphragm 54 is secured to the sump chamber housing 26 through an outer structural support member 56 which is suitably secured to the sump chamber housing 26. The outer annular support member 56 has an inwardly extending flange 58 which is adapted to limit the axial deflection of a peak 60 of one of the convolutions of diaphragm 54. A series of ports 62 through the flange 58 connect the outer portion of the diaphragm 54 to the main portion of the sump chamber 28, as will be later described.

The seal assembly 30 provides an effective means of preventing the loss of lubricating fluid from the sump chamber 28 in the manner now to be described. The convoluted diaphragm 54 is formed so that it yieldingly urges the seal ring 40 to a first position where the sealing face 42 abuts the axial sealing face 36 to form an abutting axial face-type seal. Thus, for static conditions when the rotor 10 is at rest, an effective axial face seal is provided to positively prevent leakage of lubricating fluid from the sump chamber 28. When the rotor 10 is in rotation at relatively low rates of operation, a pressure differential is created across the seal 30 by the passage of air from the main engine flow path to the outer face of the convoluted diaphragm 54. During these conditions the pressure on the exterior of the sump chamber 28 is generally insufficient to overcome the outflow of oil from the chamber and, accordingly, the convoluted diaphragm 54 is formed so that it continues to maintain the seal ring 40 against the axial sealing face 42 to provide a positive seal for these conditions.

However, at higher rotational speeds the pressurization of air in the main flow path of the engine is substantially increased, thereby increasing the pressure differential across the seal 30. At this point the friction between the rib 42 and the rotating axial sealing face 36 would be sufficiently great to cause a substantial amount of wear. However, the pressure differential across the seal 30 causes the convoluted diaphragm 54 to deflect and the seal ring 40 to be axially displaced away from the axial sealing face 36 to a second position as shown in FIGURE 2. In this position the seal ring 40 acts as a radial-type seal and the air pressure on the exterior of the seal 30 forces lubricating fluid away from the sealing surfaces 44 and into the sump chamber 28. Additionally, the stops 50 may be formed to maintain the rib 42 at a minimum distance from the axial sealing face 36 to further prevent leakage of fluid across the seal 30. Because the surfaces 44 and the radial sealing face 38 have a controlled annular clearance therebetween, the wear of the seal elements is substantially eliminated. If any oil should leak past the first rib 44 the oil film is broken by the step on surface 38 and the oil is slung radially outward towards the passageways 46. The passageways 46 then enable the lubricating fluid to be forced outward into the chamber 28.

While the pressure differential across the diaphragm 54 enables the seal ring 40 to act as a radial-type seal during normal operation of the engine, unrestricted axial displacement of the seal ring for large pressure differentials could cause a substantial increase in the stresses imposed on the convoluted diaphragm 54. The projections 50 therefore have a predetermined length so that when they abut the outer race 22 of the bearing assembly 18, the axial displacement of the seal ring 40 away from the axial sealing face 36 in the second position is sufficiently small to limit the maximum stresses imposed in the diaphragm 54. To further limit the stresses in the diaphragm 54 the radial flange 58 is positioned to abut the peak 60 of the diaphragm so that the deflection at that peak is sufficiently small to limit the stress in the diaphragm 54, as shown in FIGURE 2.

It should be noted that when the diaphragm and seal ring 40 are deflected against their stops, the projections 50 enable the bearing assembly oil to pass through the spaces between adjacent projections and the bearing race 20 to the exterior of the chamber 28. This prevents an accumulation of oil around the inner edge of the seal ring 40 to minimize the possibility of lubricating fluid from passing across the radial seal. It should also be noted that the ports 62 prevent the buildup of lubricating fluid in the outer portion of the diaphragm 54, which may coke and impair the flexibility of the diaphragm 54 across that portion of the convoluted diaphragm 54 which would be sealed off when the peak 60 abuts the flange 58.

The seal of FIGURE 1 provides an abutting axial face-type seal for below low-operating rates of the rotor 10 and a radial-type seal or combination of radial-type and axially controlled gap seals at high rates of operation. However, the invention is not limited to a radial-type seal in the second or deflected position. As shown in FIGURE 3, a rotor 10' has an axial face-type sealing surface 36' adjacent the seal ring 40'. In this embodiment circumferentially sealing surface 42' on the seal ring 40' abuts the axial sealing surface 36' for low and stationary operating conditions. However, for high operating conditions when the diaphragm 54' is deflected, stops 66 abut the outer race 22' of the bearing assembly 18' to maintain the sealing surface 42' at a fixed, relatively small distance from the sealing surface 36. Thus in the second, or deflected position, a controlled clearance axial-type seal is provided which also utilizes the air pressure differential across the seal to prevent leakage of lubricating fluid.

It can be seen then that the present invention provides a highly effective and flexible seal for use with rotating shafts. For static conditions and low operating conditions, the seal acts as an abutting axial face seal to positively seal the sump chamber 28 and at normal operating conditions the seal assembly acts as a minimum wear seal. While the diaphragm 54 is not limited to one with convolutions, it is preferable in order to minimize the outer radial dimension of the diaphragm while retaining sufficient flexibility to permit a given deflection of the seal ring 40. The invention is also not limited to the specific seal ring illustrated but may be used with equal utility with other types of seal arrangements. Additionally, the invention should not be limited solely to use in a gas turbine engine but may be used with rotating components generally having similar environmental conditions.

While the preferred embodiment of the present invention has been described, it will be apparent to those skilled in the art that modifications may be made without departing from the spirit and scope thereof.

Having thus described the invention, what is claimed as novel and desired to be secured by Letters Patent of the United States is:

1. A seal assembly for a gas turbine engine having a flow path for pressurized motive fluid therethrough, said engine comprising a rotor having a bladed outer portion extending into said flow path and an inner portion journaled in a lubricating fluid containing sump chamber to form an annular opening therewith, the annular opening of said sump chamber being exposed to pressurized motive fluid from said flow path whereby a pressure differential is maintained thereacross for rotation of said rotor at normal rates and a negligible pressure differential is maintained below low rates of rotation, said seal assembly comprising:

sealing face means positioned on the inner portion of said rotor;

seal means for cooperating with said sealing face means to form seals, said seal means being axially displaceable between a first position in which said seal means cooperates with said sealing face means to form an abutting axial face-type seal and a second position in which said seal means and said sealing face means cooperate with said fluid pressure differential to form a seal for preventing leakage thereacross against said fluid pressure differential;

means secured to said sump chamber for supporting said seal means and for providing a barrier across said annular opening, said seal support means being adapted to yieldably urge said seal means towards said first position against the action of said pressure differential so that at below substantially low rates of rotor rotation said seal means cooperates with said sealing face means to form an abutting face-type seal for said opening and for normal rates of operation cooperates with said sealing face means to seal said openings in said second position.

2. A seal assembly as in claim 1 wherein:
said seal support means comprises a convoluted diaphragm assembly formed with circumferentially extending convolutions for urging said seal means toward said first position,
whereby the radial dimensions of said diaphragm for permitting a given axial displacement of said seal means between said first and second position are minimized.

3. A seal assembly as in claim 2 wherein said fluid pressure differential on opposite sides of said annular opening is relatively large for normal operating rates and said seal assembly further comprises:
means for limiting the axial displacement of said seal means away from said first position to minimize stress in said diaphragm.

4. A seal assembly as in claim 3 further comprising:
means for limiting the axial displacement of said convoluted diaphragm away from said first position at a radially intermediate point whereby the stress in said diaphragm is further minimized.

5. A seal assembly as in claim 1 wherein:
said sealing face means comprises an axial sealing face,
said seal means includes a circumferential sealing surface for cooperating with said axial sealing face to form an abutting face-type seal in said first position and a fixed gas face-type seal in said second position.

6. A seal assembly as in claim 5 further comprising:
means for limiting the displacement of said seal means from said first position to said second position thereby to provide a given gap between said axial sealing face and said circumferential sealing surface and minimize the stress in said seal supporting means.

7. A seal assembly as in claim 1 wherein:
said sealing face means comprises axial and radial sealing faces,
said seal means includes first and second circumferential sealing surfaces for respectively cooperating with said axial sealing face to form an abutting axial face-type seal in said first position and a radial-type seal in said second position.

8. Apparatus as in claim 4 further comprising:
a bearing assembly in said sump chamber adjacent said seal means and having an inner race telescoped over the inner portion of said rotor and an outer race fixed relative to said sump chamber, said bearing being lubricated by an adjacent stream of lubricating fluid thereby concentrating lubricating fluid around said bearing assembly,
said means for limiting the axial displacement of said seal means comprises a plurality of projections extending from said seal means for abutting the outer race of said bearing assembly to limit the axial displacement of said seal means at a given level, whereby lubricating fluid is permitted to pass radially outward between said projections and away from said radial sealing face.

9. Apparatus as in claim 8 wherein:
said means for limiting the axial displacement of said seal means comprises a relatively rigid annular support for said seal means having said axially extending projections extending therefrom and secured at its outer circumference to the inner edge of said convoluted diaphragm;
said means for limiting the axial displacement of a radially intermediate portion of said convoluted diaphragm comprises a relatively rigid annular member secured to the outer circumference of said diaphragm and having a radially inwardly extending wall positioned a given distance from a peak of one of the convolutions to limit the axial displacement thereof, said annular member having openings therein radially outward from the line of contact with said peak for preventing an accumulation of lubricating fluid in the outer portion of said diaphragm.

References Cited

UNITED STATES PATENTS

| | | | |
|---|---|---|---|
| 2,008,520 | 7/1935 | Soderberg | 253—69 |
| 2,598,176 | 5/1952 | Johnstone. | |
| 2,926,050 | 2/1960 | Battle. | |
| 2,930,662 | 3/1960 | Henstridge. | |
| 3,311,343 | 3/1967 | Miller et al. | |
| 3,383,033 | 5/1968 | Moore. | |
| 3,411,794 | 11/1968 | Allen. | |

FOREIGN PATENTS 988,631  5/1951  France.

EVERETTE A. POWELL, JR., Primary Examiner